(12) United States Patent
Ren et al.

(10) Patent No.: US 11,012,963 B2
(45) Date of Patent: May 18, 2021

(54) WIRELESS COMMUNICATIONS METHOD AND APPARATUS

(71) Applicant: Huawei Technologies Co., Ltd., Shenzhen (CN)

(72) Inventors: Haibao Ren, Shanghai (CN); Zheng Wang, Shenzhen (CN); Ting Wang, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/400,678

(22) Filed: May 1, 2019

(65) Prior Publication Data
US 2019/0281571 A1 Sep. 12, 2019

Related U.S. Application Data

(63) Continuation of application No. PCT/CN2017/109381, filed on Nov. 3, 2017.

(30) Foreign Application Priority Data

Nov. 3, 2016 (CN) .......................... 201610959205.1

(51) Int. Cl.
*H04W 56/00* (2009.01)
*H04W 74/08* (2009.01)
*H04W 84/04* (2009.01)

(52) U.S. Cl.
CPC ... *H04W 56/0045* (2013.01); *H04W 56/0015* (2013.01); *H04W 74/08* (2013.01); *H04W 84/045* (2013.01)

(58) Field of Classification Search
CPC ... H04W 56/004–0055; H04W 74/006; H04W 74/0833; H04W 74/08; H04W 84/045
See application file for complete search history.

(56) References Cited

U.S. PATENT DOCUMENTS 6,856,284 B1 * 2/2005 Cangiani ............... H01Q 1/288
342/154
2008/0085715 A1 4/2008 Alm et al.
(Continued)

FOREIGN PATENT DOCUMENTS

| CN | 103069896 A | 4/2013 |
| CN | 104471866 A | 3/2015 |

(Continued)

OTHER PUBLICATIONS

Huawei, et al., "Antenna Structure Impacts on MIMO transmission", 3GPP TSG RAN WG1 Meeting #86bis, R1-1608851, Lisbon, Portugal, Oct. 10-14, 2016, 5 pages.
(Continued)

*Primary Examiner* — Michael Thier
*Assistant Examiner* — Prince A Mensah

(57) ABSTRACT

A wireless communication method and apparatus are disclosed. In an embodiment a wireless communication method includes receiving, by a first device, at least two pieces of timing advance (TA) information, wherein the at least two pieces of TA information are corresponding to at least two beams of the first device on the same carrier and performing, by the first device, timing adjustments on transmissions on the at least two beams based on the at least two pieces of TA information.

17 Claims, 5 Drawing Sheets

(56) References Cited

U.S. PATENT DOCUMENTS

| | | | |
|---|---|---|---|
| 2013/0021979 A1 | 1/2013 | Kwon et al. | |
| 2013/0188473 A1* | 7/2013 | Dinan | H04W 52/14 370/216 |
| 2013/0301619 A1* | 11/2013 | Singh | H04W 56/0045 370/336 |
| 2014/0003369 A1 | 1/2014 | Josiam et al. | |
| 2014/0016620 A1* | 1/2014 | Singh | H04L 5/0078 370/336 |
| 2015/0349866 A1* | 12/2015 | Benjebbour | H04W 72/042 370/329 |
| 2017/0202043 A1 | 7/2017 | Seo | |
| 2018/0235013 A1* | 8/2018 | Jung | H04W 74/006 |

FOREIGN PATENT DOCUMENTS

| | | | | |
|---|---|---|---|---|
| CN | 104735685 A | 6/2015 | | |
| WO | WO-2013112952 A1 * | 8/2013 | | H04W 56/0045 |
| WO | 2016085295 A1 | 6/2016 | | |
| WO | 2016153176 A1 | 9/2016 | | |

OTHER PUBLICATIONS

Huawei, et al., "Multi-panel based UL MIMO transmission", 3GPP TSG RAN WG1 Meeting #87, R1-1611665, Reno, USA, Nov. 14-18, 2016, 3 pages.

Huawei, et al., "Considerations on multi-panel based uplink transmission", 3GPP TSG RAN WG1 NR Ad Hoc Meeting, R1-1700065, Spokane, USA, Jan. 16-20, 2017, 4 pages.

Huawei, et al., "Considerations on multi-panel based uplink transmission", 3GPP TSG RAN WG1 Meeting #88, R1-1701690, Athens, Greece, Feb. 13-17, 2017, 3 pages.

Indian Office Action dated Oct. 28, 2020 issued in Application No. 201937018262, 6 pages.

\* cited by examiner

Base station 1　　　Terminal　　　Base station 2

WIRELESS COMMUNICATIONS METHOD AND APPARATUS

CROSS-REFERENCE TO RELATED APPLICATIONS

This application is a continuation of International Application No. PCT/CN2017/109381, filed on Nov. 3, 2017, which claims priority to Chinese Patent Application No. 201610959205.1, filed on Nov. 3, 2016. The disclosures of the aforementioned applications are hereby incorporated by reference in their entireties.

TECHNICAL FIELD

The present invention relates to the field of wireless communications technologies, and in particular, to a wireless communications method and apparatus.

BACKGROUND

As one of key technologies of a new radio (NR) access technology, a high frequency (HF) can provide more spectrum resources, support more antennas, and improve system capacity, and therefore the high frequency has been widely researched. As frequency increases, a wavelength of a radio signal correspondingly becomes shorter, and a size of an antenna at both ends of a transceiver can be greatly reduced due to a short wavelength, so that a plurality of antennas can be easily integrated into a panel with limited space. By using a multiple-antenna beamforming technology, transmit signal energy is collected in a direction for sending, so that coverage can be effectively improved, and therefore communication performance can be improved. Accordingly, a receiver can form a directional receive beam to receive, with a high gain, a radio signal arriving in a spatial direction. With continuous evolution of an antenna encapsulation technology, a plurality of antenna elements can be more easily combined with chip nesting to form an antenna panel or antenna array, making it possible to configure a plurality of antenna arrays with low correlation on a transmitter. A plurality of antenna panels can independently form a transmit beam, so that one transmitter can send a data stream by using different beams, so as to improve a transmission capacity or reliability. Currently, there is no desired solution for timing advance of different beam transmission signals on a same transmitter to a receiver.

SUMMARY

Embodiments provide a wireless communications method and apparatus, so that a transmitter is able to send information to a receiver by using a corresponding timing advance on different beams.

According to a first aspect, a wireless communication method includes receiving, by a first device, at least two pieces of timing advance (TA) information, where the at least two pieces of TA information are corresponding to at least two beams of the first device on a same carrier and performing, by the first device, timing adjustment on transmission on the at least two beams based on the at least two pieces of TA information.

According to the foregoing method, the first device can connect to or communicate with at least one second device by using at least two beams on a same carrier, so that a transmitter sends information to a receiver by using a corresponding timing advance on different beams, so as to ensure that when different transmit beams arrive at a target device, a timing requirement of each target device can be met, and therefore interference caused by asynchronous signals can be reduced or avoided.

In a possible design, the beam includes an antenna port set, and one antenna port set includes at least one antenna port.

In a possible design, the first device communicates with at least two second devices by using the at least two beams, and the at least two pieces of TA information are determined by the at least two second devices.

In a possible design, before the first device receives the at least two pieces of TA information, the first device may further send first information to a second device by using at least two beams on a same carrier.

In a possible design, the first information may be a preamble sent by the first device in an initial access process, or may be a transmit signal sent by a first device in a connected mode.

In a possible design, first information sent by the first device by using different beams on a same carrier may be the same or may be different.

In a possible design, the foregoing TA information may be a TA corresponding to a beam, or may be a difference used to update a TA corresponding to a beam.

In a possible design, the first device may receive, by using at least one message, at least two pieces of TA information sent by at least one second device.

In a possible design, the TA information may be in a one-to-one correspondence with a beam, or one piece of TA information may be corresponding to a plurality of beams.

Further, to improve transmission efficiency, the foregoing message may include an identifier of a beam, or may be referred to as a beam identifier (beam ID), and the identifier may explicitly indicate a beam to which the TA information corresponds.

Specifically, the identifier may have different implementations. For example, the identifier is correspondingly an ID of a configured channel state information-reference signal (CSI-RS).

If the foregoing message does not include the identifier of the beam, it may be indicated in an implicit manner that the TA information corresponds to a beam. For example, it is specified that a specified bit of a cell in the message indicates the TA information of a specified beam, so that the terminal may also learn, by parsing a specific bit, the TA information of a specified beam.

In a possible design, TA information determined by a plurality of second devices may be TA information that is received by the first device by using a plurality of messages and that is separately sent by the second devices, or may be TA information that is received by the first device and that is sent by a second device by using one or more messages.

In a possible design, the first device may further send indication information related to a multi-TA capability to a network side. Further, the indication information may be sent to an MME by using an RRC message. The first device indicates its multi-TA capability, so that the base station side can better support the multi-TA capability of the terminal, and unnecessary signaling overheads can be avoided.

In a possible design, the foregoing message used to carry the TA information may be a random access response message, or may be similar to a TA command message.

According to a second aspect, a wireless communication method includes obtaining, by a second device, at least two pieces of timing advance TA information, where the at least two pieces of TA information are corresponding to at least two beams of a first device on a same carrier and sending, by the second device, the at least two pieces of TA information to the first device.

By using the foregoing method, a transmitter sends information to a receiver by using a corresponding timing advance on different beams, so as to ensure that when different transmit beams arrive at a target device, a timing requirement of each target device can be met, and therefore interference caused by asynchronous signals can be reduced or avoided.

In a possible design, the second device sends the at least two pieces of TA information to the first device by using at least one message.

In a possible design, the second device determines the at least two pieces of TA information corresponding to the at least two beams of the first device.

In a possible design, the second device receives and obtains TA information that is sent by at least one other receive end device and that is corresponding to a beam of the first device.

In a possible design, the second device may obtain information related to a multi-TA capability of the first device. Further, the second device may obtain, from an MME, the information related to the multi-TA capability of the first device.

According to a third aspect, a communication method includes determining, by a second device, TA information corresponding to a beam of a first device, where the first device has a multi-TA capability and sending, by the second device, a second message to the first device, where the second message includes the TA information corresponding to the beam of the first device and an identifier of the beam. By using the method, when the second device communicates with the first device that has a multi-TA capability, the first device can directly and simply learn TA information corresponding to a beam.

According to a fourth aspect, a communications apparatus as a first device is configured to implement all the foregoing example wireless communication methods. The function may be implemented by hardware or may be implemented by hardware by implementing corresponding software. The hardware or the software includes one or more modules corresponding to the function. For example, a structure of the communications apparatus may include a processor and a transceiver.

According to a fifth aspect, a communications apparatus as a second device is configured to implement all the foregoing example wireless communication methods. The function may be implemented by hardware or may be implemented by hardware by implementing corresponding software. The hardware or the software includes one or more modules corresponding to the function. For example, a structure of the communications apparatus may include a processor and a transceiver.

According to another aspect, a computer storage medium is provided. The computer storage medium is configured to store a computer software instruction used for the communications apparatus in the foregoing fourth aspect, and the computer software instruction includes a program designed for executing the foregoing aspect.

According to yet another aspect, another computer storage medium is provided. The computer storage medium is configured to store a computer software instruction used for the communications apparatus in the foregoing fifth aspect, and the computer software instruction includes a program designed for executing the foregoing aspect.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
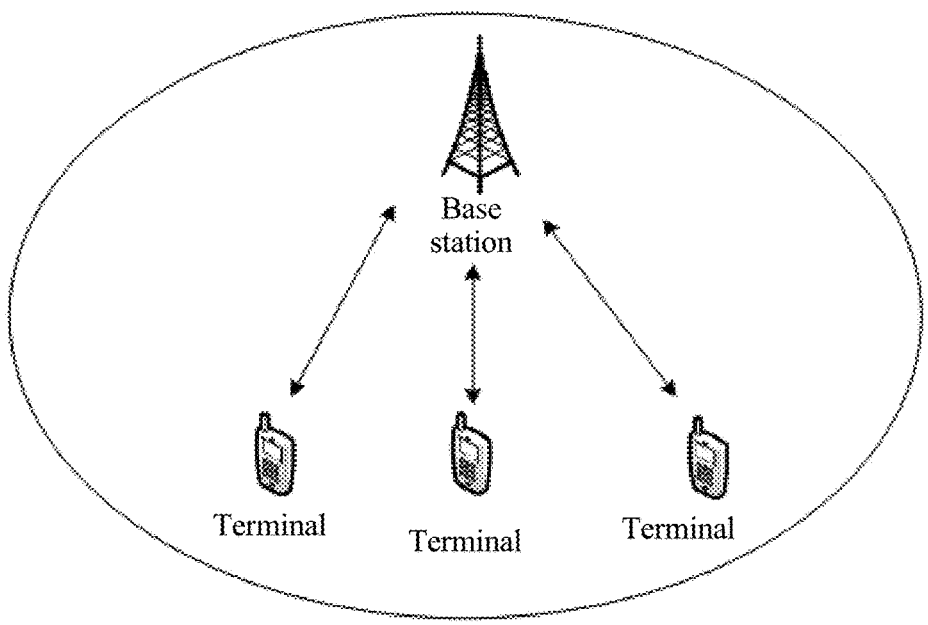
FIG. 1 is a schematic diagram of a wireless communications system according to an embodiment of the present invention.

FIG. 1 is a schematic diagram of a wireless communications system to which a technical solution of an embodiment of the present invention is applicable.

In the solution of this embodiment, in the communications system described in FIG. 1, the communications system includes at least one base station and a plurality of terminals.

A system architecture and a service scenario that are described in the embodiments of the present invention are intended to more clearly describe the technical solutions of the embodiments of the present invention, and do not constitute a limitation on the technical solutions provided in the embodiments of the present invention. Specifically, the communications system in this embodiment of the present invention may be, for example, 5G.

In the embodiments of the present invention, the base station is an apparatus that is deployed in a radio access network and configured to provide a wireless communication function for a terminal. The base station may include macro base stations, micro base stations (also referred to as small cells), relay stations, transmission/reception points (TRP), and the like in various forms. In systems using different radio access technologies, names of a device having a base station function may be different, for example, in an LTE system, the device is referred to as an evolved NodeB (eNB or eNodeB). For ease of description, in the embodiments of the present invention, the foregoing apparatuses that provide the wireless communication function for the terminal are collectively referred to as a base station.

The terminal in the embodiments of the present invention may include various handheld devices, in-vehicle devices, wearable devices, or computing devices that have a wireless communication function, or other processing devices connected to a wireless modem. The terminal may be referred to as a mobile station (MS for short), user equipment, or a terminal device, or may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or the like. For ease of description, the devices mentioned above are collectively referred to as a terminal in all the embodiments of the present invention.

It should be noted that, a quantity and a type of terminals included in the communications system shown in FIG. 1 are merely examples, and this embodiment of the present invention is not limited thereto.

The technical solutions in the embodiments of the present invention are implemented in a scenario in which a device at a transmit end (a first device) has a multi-timing advance (TA) capability, where the multi-TA capability is a capability that the device at the transmit end may use at least two TAs on a same carrier to perform transmission. Transmission herein includes but is not limited to performing physical channel or signal transmission, and the physical channel/signal includes but is not limited to a physical control channel, a physical shared channel, a sounding reference signal, and the like. In a same carrier, the first device may activate one bandwidth resource, or may activate a plurality of bandwidth resources. That at least two TAs are used to perform transmission may mean that performing transmission by using the at least two TAs is supported in one bandwidth resource, or may mean that performing transmission by using the at least two TAs is supported in a plurality of bandwidth resources.

In a 5G system, a possible design of allocating, by a base station (for example, a gNB), a frequency resource to a terminal is as follows: the base station configures a bandwidth resource for the terminal from a system frequency resource, and the base station schedules the terminal in the configured bandwidth resource. To be specific, the base station configures a bandwidth resource for the terminal from a system frequency resource, so that the base station allocates some or all of the configured bandwidth resources to the terminal for communication between the base station and the terminal. The bandwidth resource is included in the system frequency resource, and may be some continuous or discontinuous resources in the system frequency resource, or may be all resources in the system frequency resource. The bandwidth resource may also be referred to as a bandwidth part (BWP), a frequency resource part, some frequency resources, a carrier bandwidth part, or another name. This is not limited in this application. When the bandwidth resource is a segment of continuous resources in the system frequency resource, the bandwidth resource may also be referred to as a subband, a narrowband, or another name. This is not limited in this application.

Generally, one antenna panel forms one beam direction at the same time. In the beam direction, different physical signals or physical channels may be carried. For a same type of physical channel or physical signal, one beam may include one or more antenna ports, configured to transmit a data channel, a control channel, a sounding signal, or the like, or one beam may further transmit a physical channel that is used for random access, where the physical channel may be transmitted in any antenna port. For example, a transmit beam may be distribution of signal strength formed in different directions in space after a signal is transmitted through an antenna, and a receive beam may be distribution of signal strength of a radio signal that is received from the antenna and that is in different directions in space. It may be understood that one or more antenna ports in one beam may also be considered as one antenna port set, in other words, one antenna port set includes at least one antenna port. In this embodiment of the present invention, a beam may be used with an antenna port set.

Specifically, the beam may be a precoding vector that has an energy transmission directivity and can identify the precoding vector by using index information, where the energy transmission directionality means that a signal that is obtained after precoding processing by using the precoding vector has desired received power in a specific spatial location, for example, a received demodulation signal-to-noise ratio is met, and in another spatial location, power of a signal that is obtained after precoding processing by using the precoding vector is relatively low, and the received demodulation signal-to-noise ratio is not met. Different communications devices may have different precoding vectors, that is, correspond to different beams, and for a configuration or a capability of a communications device, one communications device may use one or more of a plurality of different precoding vectors at a same moment, that is, one or more beams may be formed at the same time. The beam may be defined as a space resource. A beam may be identified by using one piece of index information, and a corresponding resource ID of a user may be correspondingly configured for the index information. For example, the index information is corresponding to an ID of a configured channel state information-reference signal (CSI-RS), or may be corresponding to an ID of a configured uplink sounding reference signal (SRS), or optionally, the index information may be index information that is displayed or implicitly carried by using a specific signal or channel carried in the beam, including but not limited to index information that indicates the beam by sending a synchronization signal or a broadcast channel by using the beam.

Figure 2:
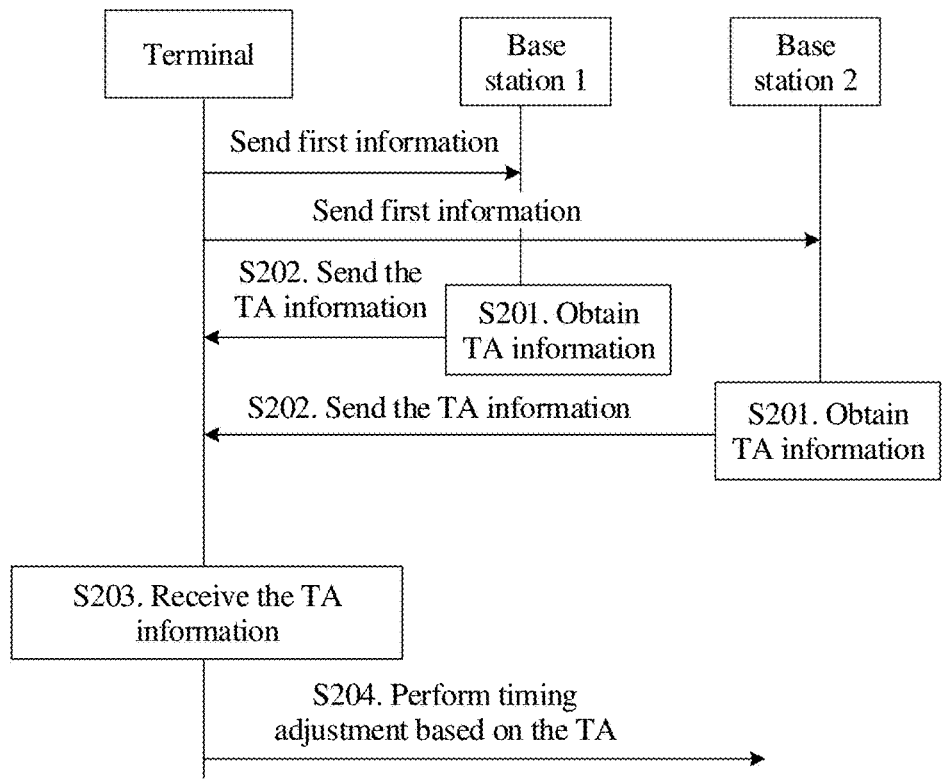
FIG. 2 is a schematic flowchart of a wireless communication method according to an embodiment of the present invention.

Specifically, an embodiment of the present invention provides a wireless communication method, which is used for communication between a first device and a second device. In this embodiment of the present invention, that a first device is a terminal and a second device is a base station is used as an example for description. As shown in FIG. 2, the method includes the following steps.

S201. A base station obtains at least two pieces of TA information.

S202. At least one base station sends TA information that is corresponding to at least two beams to a terminal.

Figure 3:
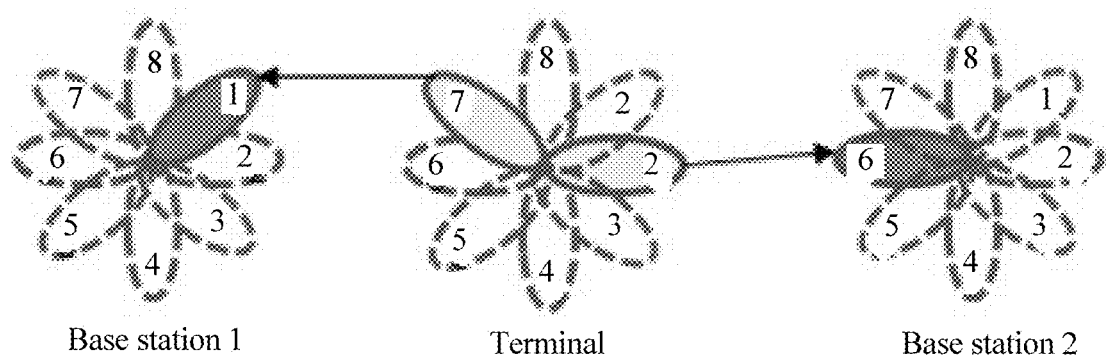
FIG. 3 is a schematic diagram of a multi-TA application scenario according to an embodiment of the present invention.
Figure 4:
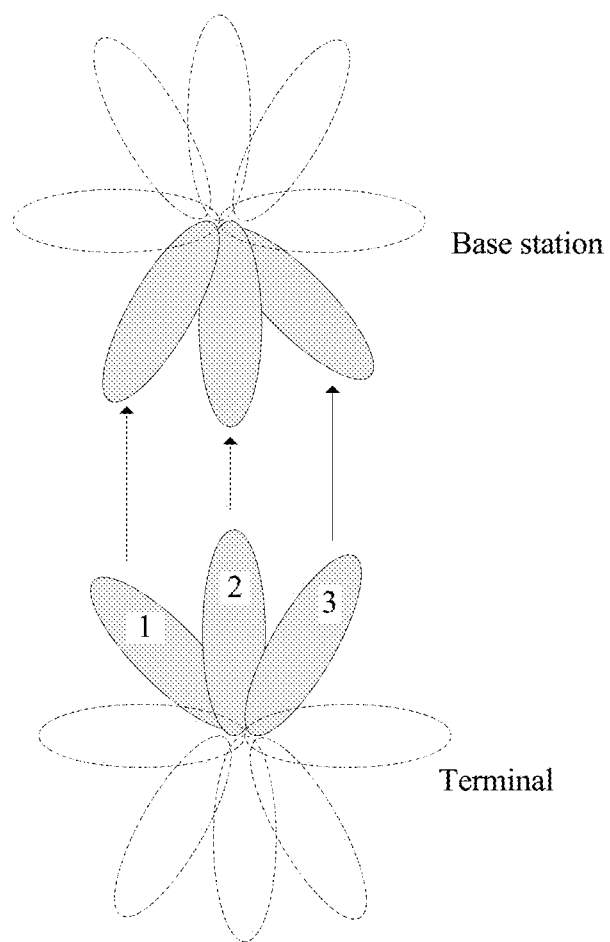
FIG. 4 is a schematic diagram of a multi-TA application scenario according to an embodiment of the present invention.

The terminal may simultaneously access one or more base stations by using at least two beams on a same carrier, or keep connected to one or more base stations by using at least two beams on a same carrier. "Simultaneously" herein means that at least two beams both transmit information within a same time period. The at least two beams may send information on one activated bandwidth resource, in other words, one activated bandwidth resource may be corresponding to at least two beams, or the at least two beams may send information on a plurality of activated bandwidth resources. When information is sent on a plurality of activated bandwidth resources, one beam may be corresponding to one or more activated bandwidth resources. A specific correspondence between a beam and an activated bandwidth is not limited in this application. In this case, the terminal may send first information to the one or more base stations by using the at least two beams on the same carrier. For example, as shown in FIG. 3, the terminal separately sends the first information to a base station 1 and a base station 2 by using a beam 7 and a beam 2, or as shown in FIG. 4, the terminal sends the first information to the base station by using three beams. Certainly, in addition to a case similar to FIG. 3 or FIG. 4, the terminal may further send the first information to one base station by using a plurality of beams, and send the first information to another base station by using one or more beams. This is not shown in this embodiment of the present invention. It should be noted that the first information herein is collectively referred to as information sent by the terminal, and the first information sent by using various beams may be the same or may be different. The first information herein may be a signal that is sent by the terminal in any form and that may be used by the base station to determine a TA.

For example, in an initial uplink synchronization process of the terminal, the first information may be a preamble. For a terminal in a connected mode, the first information may be a transmit signal sent by the terminal in the connected mode, and the transmit signal may be, for example, at least one of a sounding reference signal (SRS), a demodulation reference signal (DMRS), a channel quality indicator (CQI), a physical uplink shared channel (PUSCH), and a physical uplink control channel (PUCCH). This is not limited in this embodiment of the present invention.

Further, in a scenario shown in FIG. 3, a process in which the terminal simultaneously initially accesses the base station 1 and the base station 2 may be, for example, that the terminal may first access the base station 1, and then access the base station 2, and a process in which the terminal accesses the base station 2 may be assisted by the base station 1. For example, a PRACH resource may be pre-allocated. Therefore, a process in which the terminal accesses the base station 2 may be different from that of accessing the base station 1, a preamble sent by the terminal to the base station 1 may be different from that sent by the terminal to the base station 2, and a preamble sent by the terminal to the base station 2 is sent after the terminal sends the preamble to the base station 1. It may be understood that one or more base stations that receive the first information may obtain at least two pieces of TA information, where the at least two pieces of TA information are corresponding to at least two beams of the terminal on a same carrier. Further, the TA information may be in a one-to-one correspondence with beams on a same carrier, or may be that one piece of TA information is corresponding to a plurality of beams on a same carrier. Optionally, the plurality of beams may be pre-configured by the base station by using higher layer information. For example, the base station determines whether TA adjustment can be performed for the plurality of beams by using same TA information, based on whether times when SRSs sent by the terminal by using the plurality of beams or PRACHs or other uplink channels or signals that are carried in the plurality of beams arrive at the base station are the same or a difference between the times is less than a threshold. For another example, the base station determines, based on a receiving network device corresponding to the plurality of bandwidth resources activated by the terminal device, whether TA adjustment can be performed for the beams corresponding to the plurality of activated bandwidth resources by using the same TA information.

FIG. 2 shows an example in which a plurality of base stations receive the first information and determine TAs corresponding to the at least two beams. For example, in the scenario in FIG. 3, the base station 1 receives the first information sent by the terminal by using the beam 7, the base station 1 obtains first TA information corresponding to the beam 7, the base station 2 receives the first information sent by the terminal by using the beam 2, and the base station 2 also obtains second TA information corresponding to the beam 2. The first TA information and the second TA information may be the same, or may be different. For another example, in a scenario in FIG. 4, the base station receives the first information sent by the terminal by using the three beams, so as to obtain TA information corresponding to the three beams. In the scenario in FIG. 4, the TA information corresponding to the three beams may be the same. Therefore, a subsequent step in this embodiment of the present invention may not be performed, but the base station sends one piece of TA information to the terminal.

Further, in this embodiment of the present invention, a manner in which the base station obtains the TA information may be, for example, detecting a received preamble to search for a time point T1 at which the preamble arrives at the base station, and comparing the time point T1 with a unified uplink timing T0 of the base station, where a difference between T1 and T0 is quantized and coded, and is used as an uplink TA from the terminal to the base station. It should be noted that, the manner in which the base station determines the TA information based on the preamble may also be a manner similar to the prior art, provided that the TA information can be determined. This is not limited in this embodiment of the present invention.

Alternatively, when the first information is an uplink transmit signal sent by a terminal in a connected mode, the base station may determine a TA based on measurement of the uplink transmit signal. For example, the determining, by the base station, a TA may be detecting an uplink sounding reference signal (SRS) or another uplink signal/channel to search for a time point T4 at which the uplink sounding reference signal or the another uplink signal/channel arrives at the base station, and comparing the time point T4 with a previous timing T3, where a difference between T4 and T3 is quantized and coded as an uplink TA of the terminal, or in addition, TA information determined by the base station may be a difference between the TA and a previous TA. It should be noted that a unit of the TA value may be the same as or different from a TA unit corresponding to random access. For the manner in which the base station determines the TA information based on measurement of an uplink signal, reference may also be made to another manner in the prior art, provided that the TA information can be determined. This is not limited in this embodiment of the present invention.

It can be learned that the TA information may be a TA corresponding to a beam, or may be a difference used to update a TA corresponding to a beam. After receiving the difference, the first device may obtain the updated TA based on the previous TA.

It may be understood that, for a case similar to the foregoing case in which a process of accessing the base station 2 by the terminal is assisted by the base station 1, the base station 2 may determine the TA information after the base station 1 determines the TA information, or after the base station 1 sends the TA information, or after the terminal receives the TA information sent by the base station 1. This is not limited in this embodiment of the present invention.

Specifically, for example, in S201, the one or more base stations obtain TA information corresponding to the at least two beams. In this embodiment of the present invention, the following describes how the one or more base stations send the at least two pieces of TA information by case.

(1) One base station determines TA information corresponding to the at least two beams for the terminal.

Figure 5:
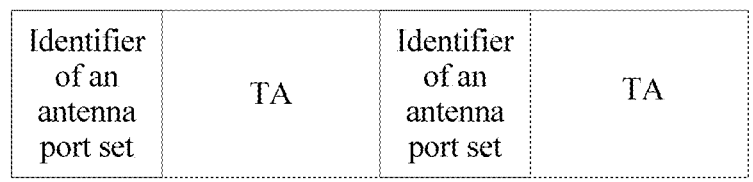
FIG. 5 is a schematic structural diagram of a TA message notified by a base station to a terminal according to an embodiment of the present invention.

In this case, the base station, namely, a first base station, obtains TA information corresponding to the at least two beams, and the first base station sends the determined TA information corresponding to the at least two beams to the terminal by using at least one first message. For example, in a scenario shown in FIG. 5, the base station respectively determines TA 1, TA 2, and TA 3 for beams 1, 2, and 3. The base station may send TA 1, TA 2, and TA 3 to the terminal by using one first message, or respectively sends TA 1, TA 2, and TA 3 to the terminal by using a plurality of first messages corresponding to each beam.

(2) A plurality of base stations determine TA information corresponding to the at least two beams for the terminal.

A scenario in which the plurality of base stations determine the TA information corresponding to the at least two beams for the terminal may be as follows: (a) A first base station in the plurality of base stations sends the TA information corresponding to the at least two beams to the terminal. In this case, another base station other than the first base station in the plurality of base stations sends the determined TA information corresponding to the beams to the first base station. After obtaining the TA information sent by the foregoing another base station, the first base station sends the TA information corresponding to the at least two beams to the terminal by using a first message. For example, in the scenario shown in FIG. 3, it is assumed that the base station 1 is the first base station, the base station 1 obtains the first TA information, and the base station 2 sends the second TA information to the base station 1. In this case, the base station 1 sends the obtained first TA information and second TA information to the terminal by using one or more first messages. (b) The plurality of base stations respectively send, to the terminal by using a plurality of first messages, the TA information corresponding to the at least two beams.

Specifically, in the scenarios described in (1) and (2), in a case of initial uplink synchronization of the terminal, the first message may be a random access response message, or when the terminal is in a connected mode, the first message may be similar to a TA command message in an LTE system.

Further, in the scenarios described in (1) and (2), the first message may further include an identifier of a beam, and the identifier explicitly indicates a specific beam corresponding to the TA information. In this simple and direct manner, transmission efficiency may be further improved. A specific structure of the first message may be shown in FIG. 5.

Optionally, the identifier may have different implementations. For example, the identifier is correspondingly an ID of a configured channel state information-reference signal (CSI-RS), or is a logical number. The logical number may be corresponding to a dynamically changed transmit and receive beam pair. The logical number may be a mapping of a reduced CSI-RS resource number/antenna port number, or a mapping of a reduced SRS resource number/antenna port number. To be specific, the base station may use many CSI-RS/SRS resources/antenna ports in total. However, for the terminal, CSI-RS/SRS resources/antenna ports measured and used by the terminal are only a subset. Therefore, a CSI-RS or an SRS previously used by the UE may be indicated in a manner that is more reduced than directly indicating a CSI-RS/SRS resource/antenna port, and a transmit beam of the terminal is further indicated. The mapping relationship may be configured by using a higher layer message, for example, configured by using a radio resource control (RRC) message or a media access control element (MAC CE). Alternatively, the identifier is a beam pair link number, and the number explicitly indicates information about a transmit and receive beam pair. Alternatively, the identifier is an SRS resource number/antenna port number, and UE is notified of a transmit beam by indicating the previously used/measured SRS resource number/antenna port number. Alternatively, the identifier is a time index of a synchronization signal block (SS block), or the identifier is an identifier of an activated bandwidth resource or bandwidth resource group, where the bandwidth resource group is a set of a plurality of activated bandwidth resources that have a same TA.

It may be understood that, when the first message does not include the identifier of the beam, it implicitly indicates a specific beam corresponding to the TA information. For example, it is specified that a specified bit of a cell in the first message indicates the TA information of a specified beam. Therefore, the terminal may also learn, by parsing a specific bit, the TA information of a specified beam, for example, configure the beam information by using the higher layer message such as the radio resource control (RRC) message or the media access control element (MAC CE), where the bit of the cell in the first message indicates, according to a preset sequence, the TA information corresponding to a specified beam, and the preset sequence may be a normal sequence. For another example, when the first message includes only TA information corresponding to one beam, the beam corresponding to the TA information is by default a beam that sends the first message. Certainly, there may be another manner of notifying the TA information. This is not limited in this embodiment of the present invention. In addition, a quantity of bits of the identifier of the beam is not limited in this embodiment of the present invention.

It may be understood that, for a case similar to the foregoing case in which a process of accessing the base station 2 by the terminal is assisted by the base station 1, the base station 2 may send the TA information after the base station 1 sends the TA information, or after the terminal receives the TA information sent by the base station 1. This is not limited in this embodiment of the present invention.

Optionally, when the TA information includes a difference used to update a TA, differences used to update a TA for various beams connected to a same base station may be the same or similar. In this case, one base station may send only one difference used to update a TA. Therefore, a plurality of beams of different TAs may be corresponding to one TA update value.

S203. The terminal receives the TA information that is corresponding to the at least two beams and that is sent by the base station.

The terminal receives the TA information that is sent by the base station in a manner of S202 and that is corresponding to the at least two beams, and performs parsing to obtain the TA corresponding to the at least two beams.

S204. The terminal performs transmission based on the TA corresponding to the at least two beams.

After obtaining the TA corresponding to the at least two beams, the terminal performs timing adjustment on transmission on the at least two beams based on the TA.

According to the method in this embodiment of the present invention, the first device may connect to or communicate with at least one second device by using at least two beams on a same carrier, so that a transmitter sends information to a receiver by using a corresponding timing advance on different beams, so as to ensure that when different transmit beams arrive at a target device, a timing requirement of each target device can be met, and therefore interference caused by asynchronous signals can be reduced or avoided. Further, in this embodiment of the present invention, to enable a base station side to better support a multi-TA capability of the terminal, when the terminal is initially accessed, the terminal may send its own indication information related to the multi-TA capability to a network side, so that the base station can learn information about the multi-TA capability of the terminal, and unnecessary signaling overheads at the base station can be avoided. The indication information related to the multi-TA capability may be indicating whether the terminal supports the multi-TA capability, or may be indicating a TA capability supported by the terminal. For example, the terminal supports a dual-TA capability, a three-TA capability, or another capability. This is not limited in this embodiment of the present invention. Specifically, the terminal may send, to the network side by using the radio resource control (RRC) message or a non-access stratum (NAS) message, the indication information related to the multi-TA capability, where the network side herein may be, for example, a mobility management entity (MME) or a base station.

It may be understood that, in the foregoing embodiment, an example in which the first device is a terminal and the second device is a base station is used for description. This embodiment of the present invention is also applicable to a scenario in which the first device and the second device are other communications apparatuses, for example, a device-to-device (D2D) scenario in which both the first device and the second device are terminals, or a scenario in which both the first device and the second device are base stations. This is not limited in this embodiment of the present invention.

In the foregoing embodiments provided in the present invention, the wireless communication method provided in the embodiments of the present invention is separately described from a perspective of each network element itself and from a perspective of interaction between the network elements. It can be understood that, to achieve the foregoing functions, each network element, such as the terminal and the base station, includes a corresponding hardware structure and/or software module for performing each function. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 6:
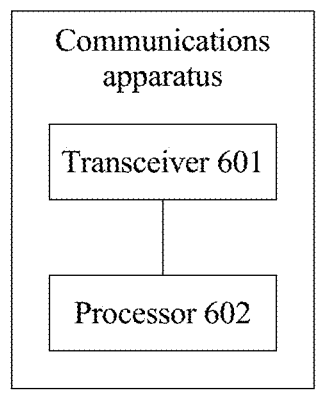
FIG. 6 is a schematic structural diagram of a communications apparatus according to an embodiment of the present invention.

FIG. 6 is a possible schematic structural diagram of a communications apparatus according to an embodiment of the present invention. The communications apparatus may implement a function of the first device in the foregoing wireless communication method embodiment, and therefore a beneficial effect of the foregoing wireless communication method can also be implemented. The communications apparatus includes a transceiver 601 and a processor 602.

The transceiver 601 is configured to receive at least two pieces of timing advance TA information, where the two pieces of TA information are corresponding to at least two beams of the first device on a same carrier.

The processor 602 is configured to perform timing adjustment on transmission on the at least two beams based on the at least two pieces of TA information.

Optionally, the at least two pieces of TA information are determined by at least two second devices.

Optionally, the transceiver 601 may be further specifically configured to receive the at least two pieces of TA information from at least one second device by using at least one message. Specifically, the foregoing message may further include an identifier of a beam.

Optionally, the transceiver 601 may be further configured to send first capability information, where the first capability information indicates information related to a multi-TA capability of the communications apparatus.

It may be understood that FIG. 6 shows only a design of the communications apparatus. In practical application, the communications apparatus may include any quantity of processors and transceivers, and all communications apparatuses that can implement the embodiments of the present invention fall within the protection scope of the present invention. Specifically, in an uplink transmission scenario, the communications apparatus may be a terminal.

Figure 7:
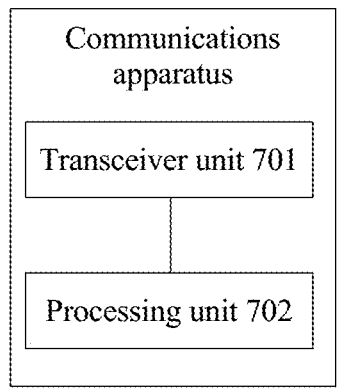
FIG. 7 is a schematic structural diagram of a communications apparatus according to an embodiment of the present invention.

FIG. 7 is a schematic structural diagram of another communications apparatus according to an embodiment of the present invention. The communications apparatus implements a function of the first device in the foregoing wireless communication method embodiment, and therefore a beneficial effect of the foregoing wireless communication method can also be implemented. The communications apparatus includes a transceiver unit 701 and a processing unit 702. The transceiver unit 701 implements a corresponding function in the transceiver 601, and the processing unit 702 implements a corresponding function in the processor 602. Specifically, in an uplink transmission scenario, the communications apparatus may be a terminal.

Figure 8:
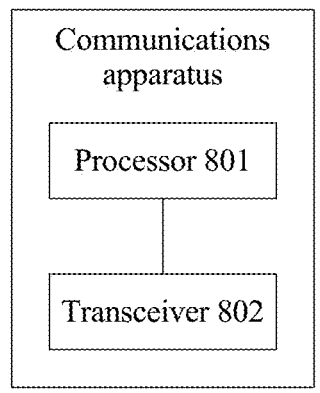
FIG. 8 is a schematic structural diagram of a communications apparatus according to an embodiment of the present invention.

FIG. 8 is a possible schematic structural diagram of a communications apparatus according to an embodiment of the present invention. The communications apparatus may implement a function of the second device in the foregoing wireless communication method embodiment, and therefore a beneficial effect of the foregoing wireless communication method can also be implemented. The communications apparatus includes a processor 801 and a transceiver 802.

Specifically, the processor 801 is configured to obtain at least two pieces of TA information, where the at least two pieces of TA information are corresponding to at least two beams of a first device on a same carrier.

The transceiver 802 is configured to send the at least two pieces of TA information to the first device.

Optionally, the transceiver 802 may be specifically configured to send the at least two pieces of TA information to the first device by using at least one message.

Optionally, the foregoing message may include an identifier of the beam.

Optionally, the transceiver 802 is specifically configured to receive TA information that is sent by at least one other second device and that is corresponding to a beam of the terminal, so that the processor may obtain the TA information sent by the at least one other second device.

Optionally, the processor 801 may be further configured to obtain information related to a multi-TA capability of the first device. For example, the information related to the multi-TA capability of the first device may be learned by using information that is carried in the first message sent by the first device to the network side and that is related to the multi-TA capability of the first device.

It may be understood that FIG. 8 shows only a design of the communications apparatus. In practical application, the communications apparatus may include any quantity of transceivers and processors, and all communications apparatuses that can implement the embodiments of the present invention fall within the protection scope of the present invention. Specifically, in an uplink transmission scenario, the communications apparatus may be a base station.

Figure 9:
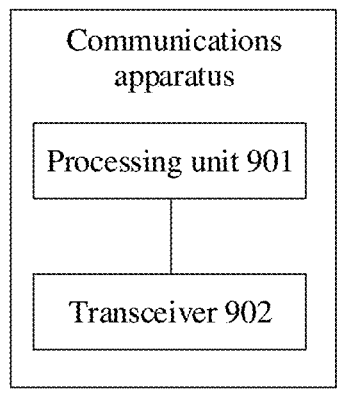
FIG. 9 is a schematic structural diagram of a communications apparatus according to an embodiment of the present invention.

FIG. 9 is a schematic structural diagram of another communications apparatus according to an embodiment of the present invention. The communications apparatus implements a function of the second device in the foregoing wireless communication method embodiment, and therefore a beneficial effect of the foregoing wireless communication method can also be implemented. The communications apparatus includes a processing unit 901 and a transceiver unit 902. The processing unit 901 implements a corresponding function in the processor 801, and the transceiver unit 902 implements a corresponding function in the transceiver 802. Specifically, in an uplink transmission scenario, the communications apparatus may be a base station.

Still another embodiment of the present invention further provides a communications apparatus. The communications apparatus includes a processor and a transceiver. The processor is configured to determine TA information corresponding to a beam of a first device, where the first device has a multi-TA capability. The transceiver is configured to send a second message to the first device, where the second message includes the TA information corresponding to the beam of the first device and an identifier of the beam. The communications apparatus may be a base station.

According to the communications apparatuses shown in FIG. 6 to FIG. 9 in the present invention, the first device may connect to or communicate with at least one second device by using at least two beams on a same carrier, so that a transmitter sends information to a receiver by using a corresponding timing advance on different beams, so as to ensure that when different transmit beams arrive at a target device, a timing requirement of each target device can be met, and therefore interference caused by asynchronous signals can be reduced or avoided. For functions, specific implementations, and interaction manners of units/modules of the communications apparatuses shown in FIG. 6 to FIG. 9, reference may be further made to corresponding descriptions in the method embodiments.

Figure 10:
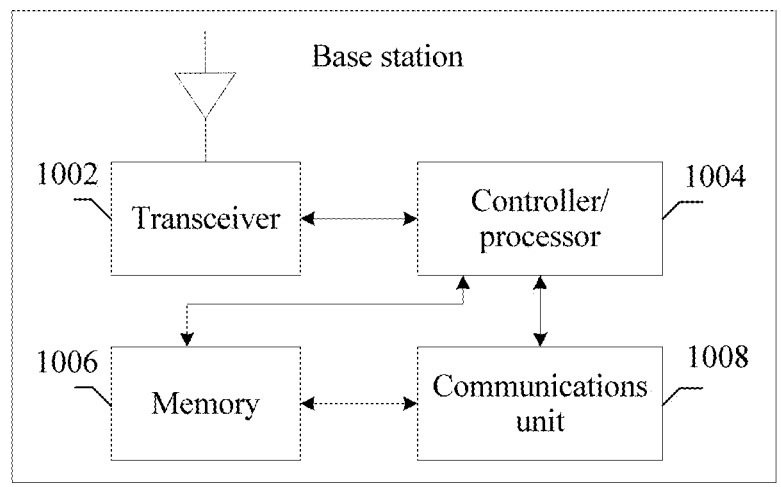
FIG. 10 is a simplified schematic structural diagram of a base station according to an embodiment of the present invention.

Further, FIG. 10 is a simplified schematic diagram of a possible structure of a base station in the foregoing embodiments.

The shown base station includes a transceiver 1002 and a controller/processor 1004. The transceiver 1002 is configured to support the base station in receiving information from and sending information to the terminal in the foregoing embodiment, and support the terminal in performing radio communication with another terminal. The controller/processor 1004 may be configured to perform various functions used for communicating with the terminal or another network device. In an uplink, an uplink signal from the terminal is received by an antenna, demodulated by the transceiver 1002, and further processed by the controller/processor 1004, so as to restore service data and signaling information that are sent by the terminal. In a downlink, service data and a signaling message are processed by the controller/processor 1004 and demodulated by the transceiver 1002, so as to generate a downlink signal, and the downlink signal is transmitted by the antenna to the terminal. The transceiver 1002 is further configured to perform the wireless communications method described in the foregoing embodiment. For example, the transceiver includes a transmitter and a receiver. The base station may further include a memory 1006 that may be configured to store program code and data of the base station. The base station may further include a communications unit 1008, configured to support the base station in communicating with another network entity. It may be understood that FIG. 10 shows only a simplified design of a base station. In practical application, the base station may include any quantity of transceivers, processors, controllers, memories, communications units, and the like, and all base stations that can implement the present invention fall within the protection scope of the present invention.

Figure 11:
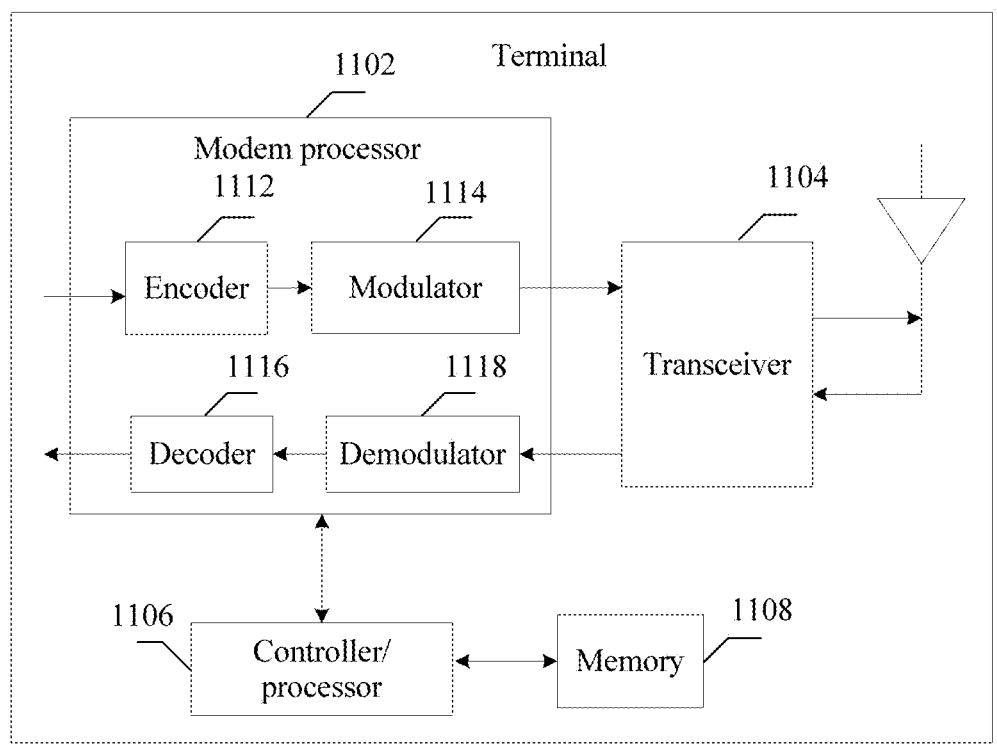
FIG. 11 is a simplified schematic structural diagram of a terminal according to an embodiment of the present invention.

FIG. 11 is a simplified schematic diagram of a possible design structure of a terminal in the foregoing embodiments. The terminal includes a transmitter 1104 and a controller/processor 1106, and may further include a memory 1108 and a modem processor 1102.

The transmitter 1104 performs adjustment (such as analog-conversion, filtering, amplification, and up-conversion) on an output sample and generates an uplink signal. The uplink signal is transmitted by an antenna to the base station in the foregoing embodiment. In a downlink, the antenna receives a downlink signal transmitted by the base station in the foregoing embodiment. The transceiver 1104 performs adjustment (such as filtering, amplification, down-conversion, and digitization) on a signal received from an antenna and provides an input sample. In the modem processor 1102, an encoder 1112 receives service data and a signaling message that are to be sent in an uplink, and performs processing (such as formatting, coding, and interleaving) on the service data and the signaling message. A modulator 1114 further performs processing (such as symbol mapping and modulation) on service data and a signaling message that are encoded and provides an output sample. A demodulator 1118 performs processing (such as demodulation) on the input sample and provides symbol estimation. A decoder 1116 performs processing (such as de-interleaving and decoding) on the symbol estimation and provides the decoded data and signaling message to be sent to the terminal. The encoder 1112, the modulator 1114, the demodulator 1118, and the decoder 1116 may be implemented by the composite modem processor 1102. These units perform processing based on a radio access technology (such as an access technology in LTE and another evolved system) used by a radio access network. The controller/processor 1106 controls and manages an action of the terminal, and is configured to perform processing performed by the terminal in the foregoing embodiment. For example, the transceiver 1104 includes a transmitter and a receiver. The memory 1108 is configured to store program code and data used for the terminal.

The controller/processor configured to perform functions of the base station, the UE, or the control node in the foregoing embodiments may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

It should be noted that the wireless communications method and the communications apparatus that are provided in the foregoing embodiments of the present invention are applicable to any scenario in which there is data transmission, and are not limited to a service that has a relatively high transmission rate requirement, a relatively high transmission delay requirement, and a relatively high transmission reliability requirement.

Method or algorithm steps described in combination with the content disclosed in the present invention may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal. Certainly, the processor and the storage medium may exist in the terminal as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A wireless communication method implemented by a first device comprising:
   receiving at least two pieces of timing advance (TA) information corresponding to at least two beams of the first device on a same carrier; and
   performing transmissions to at least one second device by simultaneously using the at least two beams on the same carrier based on the at least two pieces of TA information,
   wherein timing adjustments are performed on the transmissions on the at least two beams based on the at least two pieces of TA information, and
   the method further comprises sending capability information to the at least one second device, the capability information indicating information related to a multi-TA capability of the first device, and the multi-TA capability comprising a capability that the first device can use the at least two pieces of TA information to perform transmissions by using the at least two beams on the same carrier.

2. The method according to claim 1, wherein each of the at least two beams is provided by an antenna port set.

3. The method according to claim 1, wherein the at least two pieces of TA information are determined by at least two second devices.

4. The method according to claim 1, wherein the first device receives the at least two pieces of TA information through at least one message.

5. The method according to claim 4, wherein the at least one message comprises an identifier for each of the at least two beams.

6. The method according to claim 4, wherein the at least two pieces of TA information are determined based on corresponding bits of a cell in the at least one message.

7. A communications apparatus comprising:
   a transceiver configured to receive at least two pieces of timing advance (TA) information corresponding to at least two beams of the communications apparatus on a same carrier; and
   a processor configured to perform transmissions to at least one second device by simultaneously using the at least two beams on the same carrier based on the at least two pieces of TA information, wherein timing adjustments are performed on the transmissions on the at least two beams based on the at least two pieces of TA information,
   wherein the transceiver is further configured to send capability information to the at least one second device, the capability information indicating information related to a multi-TA capability of the communications apparatus, and the multi-TA capability comprising a capability that the communications apparatus can use the at least two pieces of TA information to perform transmissions by using the at least two beams on the same carrier.

8. The apparatus according to claim 7, wherein the at least two pieces of TA information are determined by at least two second devices.

9. The apparatus according to claim 7, wherein the transceiver is configured to receive the at least two pieces of TA information through at least one message.

10. The apparatus according to claim 9, wherein the at least one message comprises an identifier of an antenna port set.

11. The apparatus according to claim 7, wherein each of the at least two beams is provided by an antenna port set.

12. A communications apparatus comprising:
   a processor configured to obtain at least two pieces of timing advance (TA) information corresponding to at least two beams of a first device on a same carrier; and
   a transceiver configured to send the at least two pieces of TA information to the first device, wherein the first device can use the at least two pieces of TA information to perform timing adjustments on transmissions to the communication apparatus by simultaneously using the at least two beams on the same carrier,
wherein the processor is further configured to obtain information indicating a multi-TA capability of the first device, the multi-TA capability comprising a capability that the first device can use the at least two pieces of TA information to perform transmissions by using the at least two beams on the same carrier.

13. The apparatus according to claim 12, wherein the transceiver is configured to send the at least two pieces of TA information to the first device through at least one message.

14. The apparatus according to claim 13, wherein the at least one message comprises an identifier for each of the at least two beams.

15. The apparatus according to claim 12, wherein the processor is further configured to determine the at least two pieces of TA information corresponding to the at least two beams of the first device.

16. The apparatus according to claim 12, wherein each of the at least two beams is provided by an antenna port set.

17. The apparatus according to claim 12, wherein each of the at least two beams corresponds to a precoding vector, and a signal obtained after precoding processing by using the precoding vector has desired receiving power in a specific spatial location.

* * * * *